(12) United States Patent
Zhu

(10) Patent No.: US 9,791,555 B2
(45) Date of Patent: Oct. 17, 2017

(54) HIGH SPEED 360 DEGREE SCANNING LIDAR HEAD

(75) Inventor: Xiang Zhu, Richmond (CA)

(73) Assignee: Neptec Design Group Ltd., Kanata (CA)

( * ) Notice: Subject to any disclaimer, the term of this patent is extended or adjusted under 35 U.S.C. 154(b) by 242 days.

(21) Appl. No.: 14/397,155

(22) PCT Filed: May 26, 2012

(86) PCT No.: PCT/CA2012/000380
§ 371 (c)(1),
(2), (4) Date: Mar. 16, 2015

(87) PCT Pub. No.: WO2013/177650
PCT Pub. Date: Dec. 5, 2013

(65) Prior Publication Data
US 2015/0185313 A1    Jul. 2, 2015

(51) Int. Cl.
*G01C 3/08* (2006.01)
*G01S 7/481* (2006.01)
(Continued)

(52) U.S. Cl.
CPC ............ *G01S 7/4817* (2013.01); *G01S 7/481* (2013.01); *G01S 7/4812* (2013.01); *G01S 17/08* (2013.01);
(Continued)

(58) Field of Classification Search
CPC .......... G01S 17/08; G01S 17/36; G01S 17/42; G01S 17/10; G01S 7/481; G01S 7/4812;
(Continued)

(56) References Cited

U.S. PATENT DOCUMENTS 5,359,403 A   10/1994   Grosmann et al.
5,371,581 A   12/1994   Wangler et al.
(Continued)

FOREIGN PATENT DOCUMENTS

AT   510175 A4    2/2012
CA   2732418 A1   3/2010
(Continued)

OTHER PUBLICATIONS

Extended EPO Search Report issued Jan. 29, 2016 in corresponding European Application No. EP12878134.
(Continued)

*Primary Examiner* — Mark Hellner
(74) *Attorney, Agent, or Firm* — Harness, Dickey & Pierce, P.L.C.

(57) ABSTRACT

A head for directing radiated energy from a source to a coordinate in a field of view defined by at least one of azimuth and elevation, comprises an angled element and a planar reflecting element. The angled element rotates about a first axis and redirects the beam, the redirection of the angled element differing in at least one of direction and extent as it is rotated. An axis normal to the surface extends at an angle to the second axis. The reflecting surface receives the redirected beam at a point thereon and reflects it in a direction within the FOV. A rotator may be positioned between the source and the angled element to support and independently rotate the angled element and the reflecting surface about the first and second axes without impeding the energy.

19 Claims, 15 Drawing Sheets

(51) Int. Cl.
   *G01S 17/08*    (2006.01)
   *G01S 17/36*    (2006.01)
   *G02B 26/08*    (2006.01)
   *G02B 26/10*    (2006.01)
   *G01S 17/10*    (2006.01)
   *G01S 17/42*    (2006.01)

(52) U.S. Cl.
   CPC .............. *G01S 17/10* (2013.01); *G01S 17/36* (2013.01); *G01S 17/42* (2013.01); *G02B 26/0883* (2013.01); *G02B 26/101* (2013.01); *G02B 26/105* (2013.01); *G02B 26/108* (2013.01)

(58) Field of Classification Search
   CPC ... G01S 7/4817; G02B 26/108; G02B 26/101; G02B 26/0883; G02B 26/105
   USPC ........................................................ 356/5.01
   See application file for complete search history.

(56) References Cited

U.S. PATENT DOCUMENTS

| | | | |
|---|---|---|---|
| 5,438,449 A * | 8/1995 | Chabot | G01C 21/00 359/211.1 |
| 7,236,299 B1 | 6/2007 | Smith | |
| 7,336,407 B1 | 2/2008 | Adams et al. | |
| 7,697,125 B2 | 4/2010 | Swenson et al. | |
| 2006/0231771 A1 | 10/2006 | Lee et al. | |
| 2009/0323203 A1 | 12/2009 | Adams et al. | |
| 2015/0355327 A1* | 12/2015 | Goodwin | G01S 17/325 356/5.01 |

FOREIGN PATENT DOCUMENTS

| | | |
|---|---|---|
| EP | 0562941 A1 | 9/1993 |
| EP | 2381272 A1 | 10/2011 |
| WO | 2009155924 A1 | 12/2009 |
| WO | 2013177650 A1 | 12/2013 |

OTHER PUBLICATIONS

Schwarze, Craig: "A New Look at Risley Prisms," Photonics Spectra, Laurin Publishing Co., Inc., US; vol. 40, No. 6, Jun. 1, 2006, pp. 67-70, XP002533333, ISSN: 0731-1230.

International Preliminary Report on Patentability issued in PCT/CA2012/000380, completed Oct. 28, 2014, 6 pages.

International Search Report and Written Opinion issued in PCT/CA2012/000380, mailed Jan. 2, 2013, 8 pages.

* cited by examiner

_HIGH SPEED 360 DEGREE SCANNING LIDAR HEAD_

CROSS-REFERENCE TO RELATED APPLICATION

This application is a national phase application of PCT Application No. PCT/CA2012/000380, internationally filed Apr. 26, 2012, which is herein incorporated by reference in its entirety.

TECHNICAL FIELD

The present disclosure relates to scanning LIDARs and in particular to a high speed 360 degree scanning LIDAR head.

SUMMARY

Optical ranging sensors for determining the profile of the surface of an object relative to a reference plane are known. In some aspects, such sensors are often used to determine the range from the sensor to the object. Typically, they involve the transmission of an optical launch beam for reflection by the object and measurement of a scattered return beam from which the range to the object may be calculated. One such system is Light Detection And Ranging (LIDAR) which measures the time of flight (TOF) of a collimated optical launch beam (typically using laser pulses) and its scattered return beam.

Monostatic LIDAR sensors, in which the launch beam and return beam are co-aligned, are relatively simple in structure. A simple example non-scanning monostatic LIDAR sensor is schematically shown in FIG. 1, in which the sensor 1 includes a beam source 2, which is typically a pulsed laser, a first lens 3, a beam splitter 4, a second lens 6, a detector 7 and a TOF unit 11. A pulsed launch beam 8, which may be a laser beam, emanating from the beam source 2 passes through the first lens 3 and beam splitter 4, projecting the launch beam 8 onto an object 10, whose range is to be measured. The series of reflecting and refracting elements through which the launch beam 8 is passed is known as the sensor head.

The beam splitter 4 receives laser light reflected back from the object 10 and is arranged so that the component of the return beam 9 between the object 10 and the beam splitter 4 is co-aligned with the launch beam 8 so that the return beam 9 impinges upon the detector 7. The beam splitter 4 reflects the return beam 9 at 90° onto the detector 7 via the second lens 6. The range is measured by a TOF unit 11 using a TOF technique based on the time interval between the pulsed launch beam 8 and detected return beam 9 and knowledge of the speed of light.

In some example embodiments, the beam splitter 4 could be replaced by a parabolic mirror (not shown) facing the object 10, with a central aperture to allow the launch beam 8 to pass through it.

In some example embodiments, three-dimensional sensing may be obtained by mounting the sensor on a pan-tilt unit that is re-oriented from time to time so that the launch beam 8 is reflected off different locations on the surface of the object 10 or by interposing an optical scanner (not shown) between the beam splitter 4 and the object 10 to control the beam direction so as to direct the launch beam 8 along a two-dimensional grid (usually designated as comprising x- and y-coordinate values or azimuth and elevation) substantially normal to the launch beam axis and defining the reference plane, and measuring as the range, the z-coordinate lying on an axis normal to the reference plane, for each (x,y) coordinate pair. In such an arrangement, the optical scanner also receives laser light reflected back from the object 10 and is arranged to maintain the co-aligned arrangement between the component of the return beam 9 and the launch beam 8 between the object 10 and the optical scanner, so as to ensure that the detector 7 images the return beam 9 regardless of scanning angle (a concept known as auto-synchronization).

The maximum angular direction at which the launch beam 8 may be directed by the optical scanner while remaining auto-synchronized defines the field of view (FOV) of the sensor. Generally, it is considered beneficial to have as large a FOV as possible.

Monostatic optics are often used in scanning LIDARs because of their relatively small mirror size. In some example embodiments, it is beneficial to have as small a sensor package as possible. Moreover, in many applications for optical ranging sensors, the sensor is mounted on a moving platform, which may be ground-, underwater-, air- or even space-based, to detect objects in the platform's path or more generally, within its field of view, so as to allow the platform to be maneuvered toward, away or through the obstacles as desired or alternatively to map the environment in which the platform is operating.

However, because monostatic LIDAR sensors have the return beam 9 co-aligned with the launch beam 8, there is a risk that scattering of the launch beam 8 may be detected at the detector 7, which may lead to anomalous range calculations, since any scattering lies in the path of the receiving optics. For this reason, monostatic LIDAR sensors typically do not detect the return beam 9 from objects 10 that are within a few meters range. Furthermore, because the power of the return beam 9 attenuates significantly as range increases, unless the detector 7 has an extremely high dynamic range, it also may not detect the return beam 9 if the object 10 is distant.

By way of non-limiting example, if a monostatic LIDAR sensor is designed to have a range from 0.5 m to 3 km, the dynamic range of an avalanche photodiode (APD) detector 7 may approach $$75.5 \text{ dB} \left( = 10\log\left(\left(\frac{3000}{0.5}\right)^2\right)\right)$$

according to the LIDAR return signal equation for returned pulses by an object 10, as set out in Equation (1) below:

$$P_t(R) \propto P_0 \times \varepsilon \times \exp\left[-2\int_0^R \alpha(R')dR'\right] \times \frac{A}{R^2} \quad (1)$$

where R is the range to the target,
  P(R) is the LIDAR returned power from scattering at range R,
  $P_0$ is the LIDAR launch pulse power,
  α(R) is the extinction coefficient of the aerosol at range R,
  A is the receiving optical aperture, and
  ε is the target reflectance.
The dynamic range could be even higher if one takes into account the return beam variation due to target reflectance. Thus, the total dynamic range could exceed 90 dB.

In computer vision applications, such as, by way of non-limiting example, for navigation of a robot or an autonomous vehicle, a scanning LIDAR is often employed to acquire 3D imagery. In some example applications, such as mobile sensor applications, the specifications of such scanning LIDARs are challenging. In some example embodiments, the FOV may be specified to be substantially 360° in azimuth (in some example embodiments represented by the x-coordinate)×substantially 45° in elevation (in some example embodiments represented by the y-coordinate), with a resolution of 3 mrad (0.17°) in both the azimuthal and elevation directions.

Additionally, in some example embodiments, the operational parameters in which the sensor may be requested to operate may be challenging. For example, the frame rate may be specified to be on the order of 1 Hz and the maximum sensor range may be as much as 1 km.

Such specifications pose additional issues for the design. For example, a scanning LIDAR having a 360° (azimuth)× 45° (elevation) FOV with a resolution of 3 mrad, calls for a mesh of 548k sampling points (2094 points horizontally and 262 points vertically). If a frame rate of 1 Hz is specified, the sensor will have a minimum data rate of 548 kHz.

In some example embodiments, the scanning LIDAR sensor may be further constrained to occupy a small volume and have a small weight with low power consumption.

Typically, to provide a sensor with a 360° azimuthal FOV, some sort of spinning mechanism is incorporated as, or in place of, the pan-tilt or scanning mechanism or both. A number of systems capable of providing such a FOV are known.

One such system is described in US Patent Application Publication No. 2005/0246065 filed by Ricard on 3 May 2005 and published 3 Nov. 2005 and entitled "Volumetric Sensor for Mobile Robotics". The sensor is a volumetric sensor for mobile robot navigation to avoid obstacles in the robot's path and includes a laser volumetric sensor on a platform with a laser and detector directed to a tiltable mirror in a first transparent cylinder that is rotatable through 360° by a motor, a rotatable cam in the cylinder tilts the mirror to provide a laser scan and distance measurements of obstacles near the robot. A stereo camera is held by the platform, that camera being rotatable by a motor to provide distance measurements to more remote objects.

The Ricard sensor employs a short range off-the-shelf laser ranging system capable of providing measurements of less than substantially 50 m. The laser ranging system scans only 33 lines vertically in a 360° helical scan pattern in 1 s. Additionally, the scanning mechanism, employing a tiltable mirror, a protective cover and a window that is rotated with the mirror, is complex and may not be amenable to an increased scan rate.

Another such system is provided by Velodyne Lidar Inc. of Morgan Hill, Calif. The Velodyne model HDL-64 High Definition LiDAR is commonly found in autonomous vehicles. In the Velodyne system, the entire head (consisting of both scanning optics and electrical system) is spun. The scanning optics employs 64 pairs of lasers and detectors. Such a design employs special designs to pass data (at a rate of 1.3 M points per second) and power to the spinning head, which rotates at substantially 15 revolutions per second.

The Velodyne sensor however, spans only 64 lines in the vertical direction and has a short maximum range of substantially 120m.

BRIEF DESCRIPTION OF THE DRAWINGS

Example embodiments of the present disclosure will now be described by reference to the following figures, in which identical reference numerals in different figures indicate identical elements and in which.

DETAILED DESCRIPTION

Figure 1:
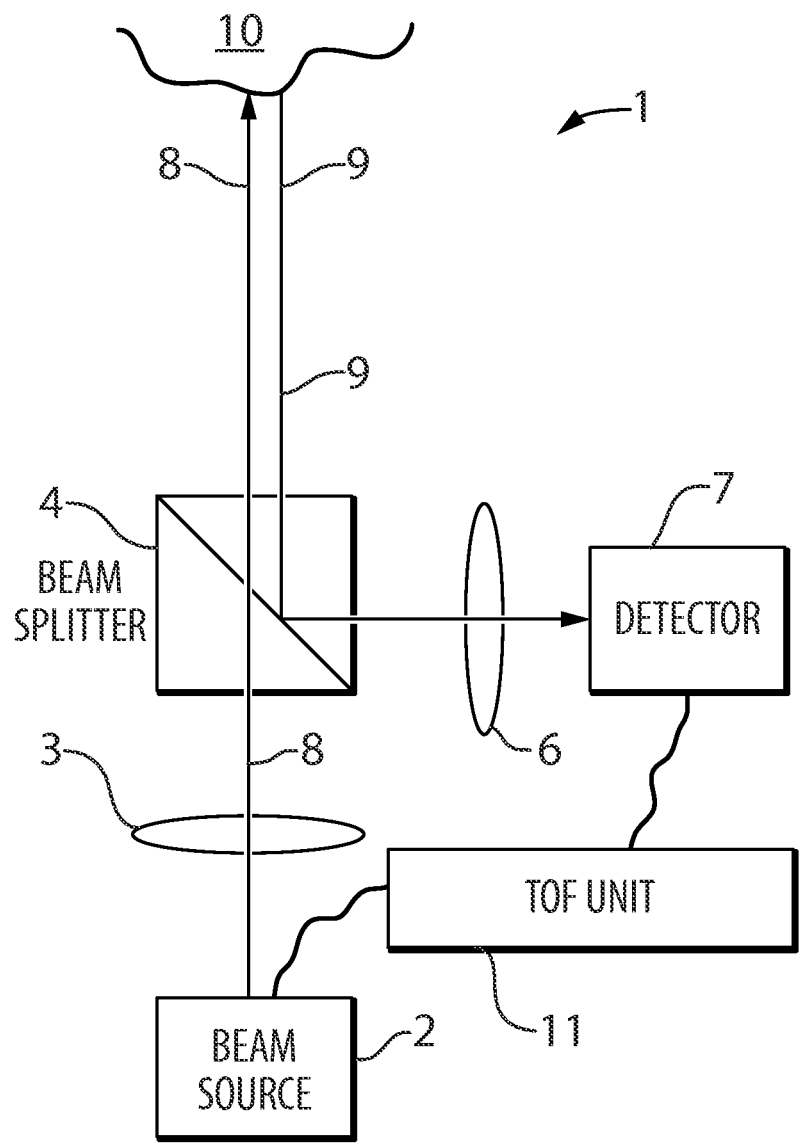
FIG. 1 is a schematic diagram of a non-scanning monostatic LIDAR optical ranging sensor.
Figure 2:
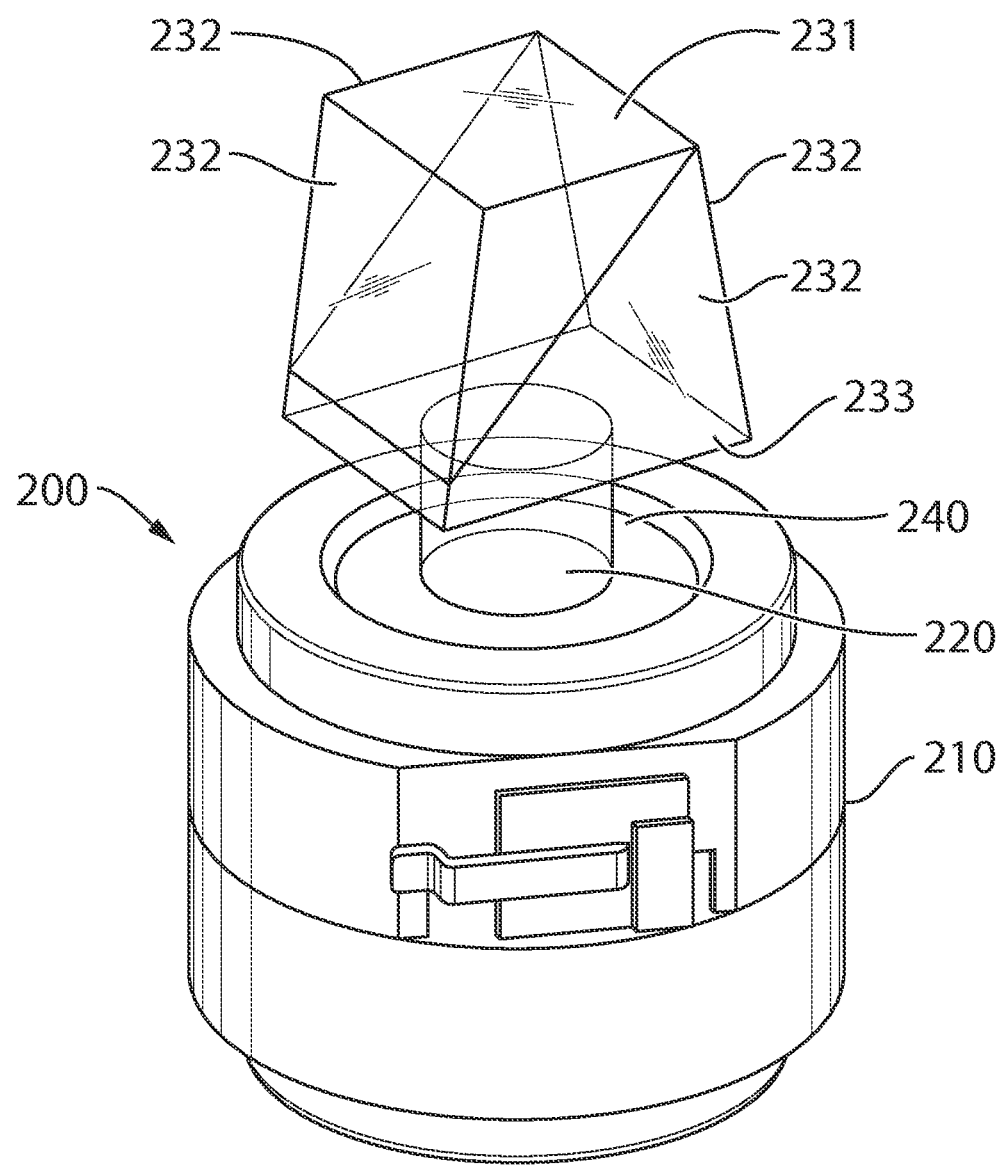
FIG. 2 is a perspective view of an example embodiment of a high speed 360° scanning LIDAR head in accordance with an example embodiment of the present disclosure.
Figure 2A:
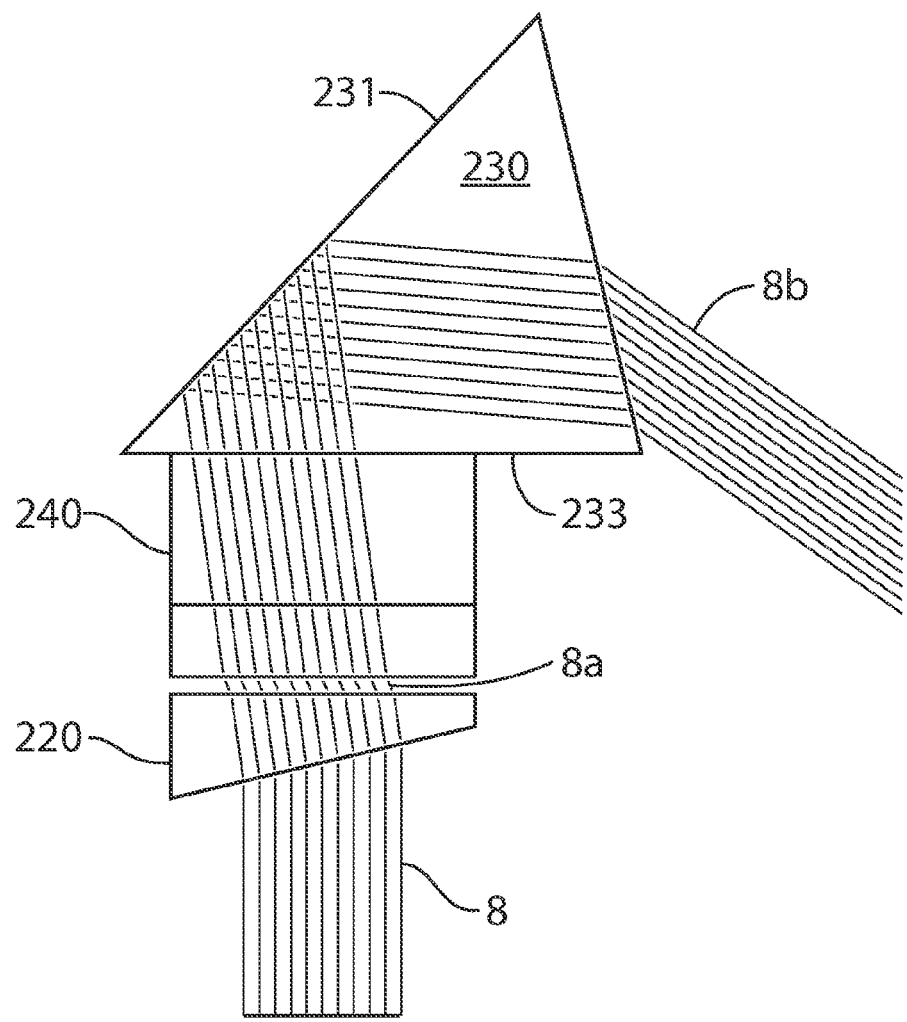
FIG. 2(a) is a cross-sectional view of an example embodiment of an optical path for the LIDAR head of FIG. 2.

The present disclosure provides an example embodiment of a high speed 360 degree scanning LIDAR head. The head, shown generally at 200 in perspective view in FIG. 2, comprises an angled element 220 and a reflecting element 230. In some example embodiments, the angled element 220 and the reflecting element 230 are separated by a transparent cylinder 240 secured to the reflecting element 230. The optical path defined by the angled element 220, reflecting element 230 and the cylinder 240 is shown in cross-sectional view in FIG. 2(a). In some example embodiments, the head 200 further comprises a rotator 210. Nevertheless for purposes of illustration, the rotator 210 will be described first.

The Rotator 210

The rotator 210 is capable of independently rotating the angled element 220 and reflecting element 230. In some example embodiments, the rotator 210 comprises first and second motors 211, 212. In some example embodiments a suitable rotator 210 may comprise a full-height controller of the 25 mm (1.0") diameter Clear Aperture Compact Beam Steering System (model RP-25F) for laser beam steering sold by Optra, Inc. of Topsfield Mass. The RP-25F system employs a compact Risley prism pair assembly.

Risley prism systems comprise a pair of rotatable wedge-shaped prisms, usually of equal apex angle, which can be rotated with respect to each other about a common optical axis. The flat portions of each prism are in some example embodiments oriented parallel to one another. In some example embodiments, the flat portions are substantially normal to the optical axis. When a laser beam is directed along the optical axis, each prism refracts the laser beam. By selecting the amount of rotation of each prism, the output of the system may be directed to any position within a solid angle defined by the maximum reflection of the prisms. Risley prism systems may be used to make accurate angular measurements of an incoming beam, or conversely to deploy an outgoing laser beam in a controlled scan.

However, Risley prism systems do not typically achieve a 360° azimuthal FOV since they employ two transmission prisms, so that the refracted launch beam 8 will necessarily go forward. Rather, the transmission optics provide a forward-looking FOV. For example, the Optra model RP-25F Risley prism pair assembly system only provides 120° full cone angle steering range, albeit with a pointing accuracy of 1.0 mrad and a positioning resolution of 0.1 mrad.

Figure 3:
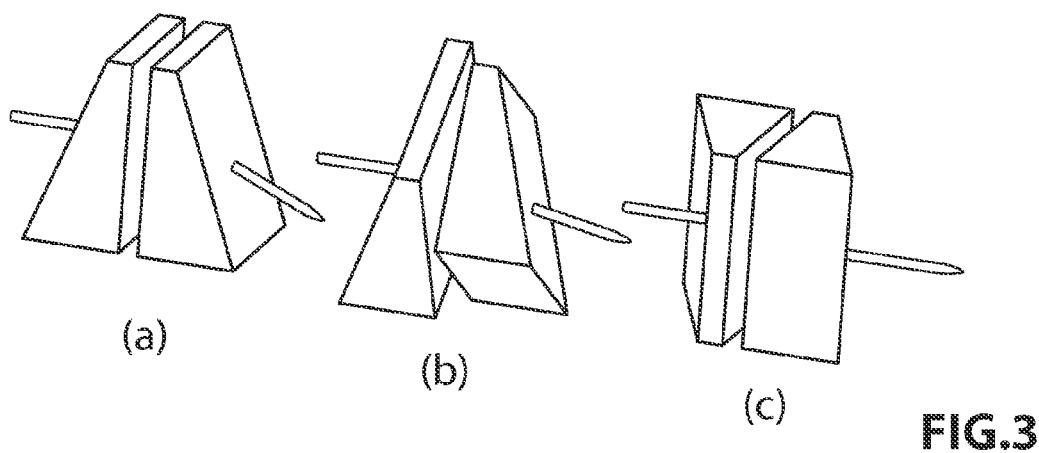
FIG. 3(a) is a perspective schematic view of an example embodiment of a Risley prism pair oriented such that the prisms both deflect light in the same direction.
FIG. 3(b) is a perspective schematic view of the Risley prism pair of FIG. 3(a) wherein each prism has been rotated about the optical axis by an equal amount but in opposite directions.
FIG. 3(c) is a perspective schematic view of the Risley prism pair of FIG. 3(a) wherein each prism has been rotated by 90°.

FIG. 3 shows a trio of views of various rotational positions of a pair of Risley prisms. In FIG. 3(a), the prisms are shown oriented such that they both reflect light in the same direction and act as a single prism with twice the prism angle of either. In FIG. 3(b), each prism has been rotated about the optical axis by the same angle, but in opposite directions. In this case the beam remains close to the plane defined by the optical axis and the refracted beam shown in FIG. 3(a). Finally, in FIG. 3(c), each prism has been rotated by 90° and they combine to act as a parallel plate with no set angular deviation.

Figure 4:
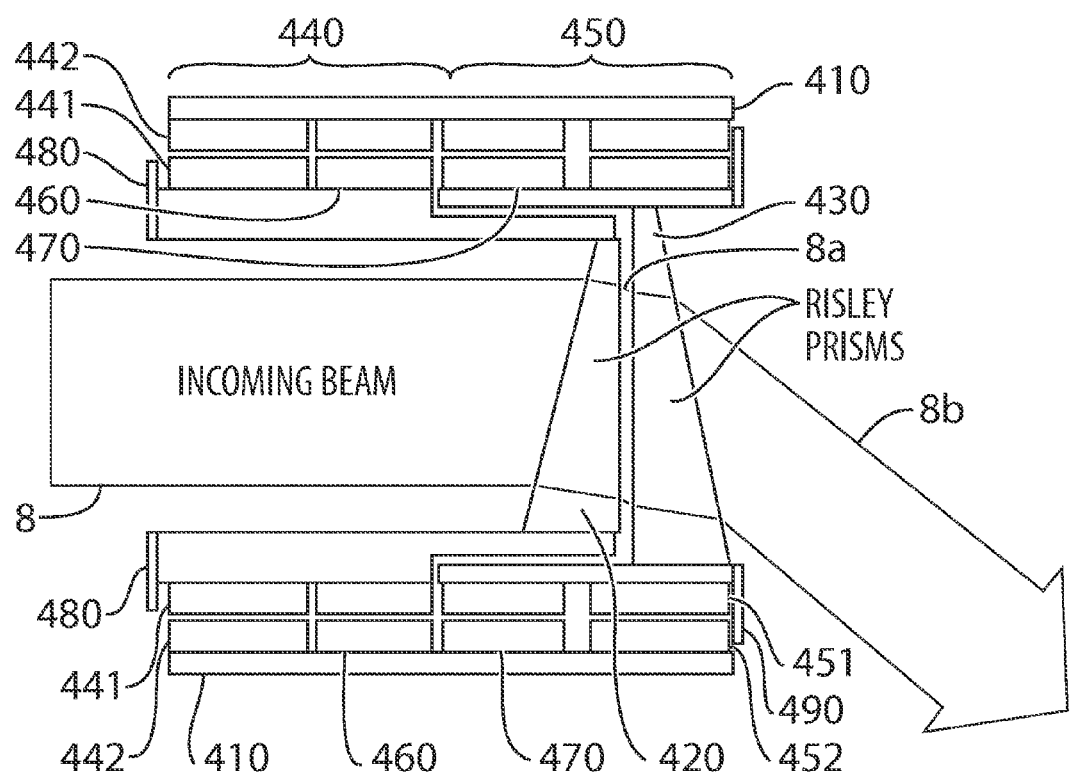
FIG. 4 is a cross-sectional schematic view of an example embodiment of a Risley prism system.

FIG. 4 is a cross-sectional schematic view of a Risley prism system layout, comprising a housing 410, a first wedge prism 420, a second wedge prism 430, a first motor 440, a second motor 450, a first bearing 460, a second bearing 470, a first rotary encoder 480 and a second rotary encoder 490.

In some example embodiments, the first and second motors 440, 450 are both hollow-core brushless motors, co-axially aligned and longitudinally separated within the housing 410. Each motor 440, 450 comprises a corresponding pair of rotors 441, 451 and stators 442, 452. The first prism 420 is secured to rotor 441 of the first motor 440 and supported by first bearing 460. The second prism 430 is secured to rotor 451 of the second motor 451 and supported by second bearing 470. The rotary encoders 480, 490 are positioned at respective ends of the housing 410 and convert the angular position of the first prism 420 and second prism 420 respectively to an analog or digital code for further computation.

While the Optra RP-25F system comprises both a controller (including driver electronics and interface hardware) and a Risley prism pair assembly (comprising first and second wedge prisms 420, 430) that are intended to work in cooperation, the controller may be employed, separately from the Risley prism pair assembly, to function as the rotator 210 with the motors 440, 450 respectively acting as the first and second motors 211, 212 to drive the angled element 220 and reflecting element 230 respectively as described herein. In some example embodiments, the rotator 210 may have a central aperture of 30 mm diameter through which the launch beam 8 may pass before incidence upon first the angled element 220 and second the reflecting element 230 as discussed below. In some example embodiments, the rotator 210 may spin elements secured thereto at rates of substantially 100 rotations per second (6000 RPM).

In some example embodiments, the interposition of the rotator 210 between the energy source 2 and the angled element 220, with the reflecting element 230 positioned on the other side of the angled element 220 from the rotator 210, permits only the optical elements 220, 230 to be rotated. This dispenses with any mechanism to pass data and power to the spinning LIDAR head 200, which facilitate rapid rotational rates.

In some example embodiments, mounts (not shown) of the rotator 210 may be positioned at an elevation substantially below −35° to facilitate avoiding beam blockage. Such a configuration may also facilitate an optical design that substantially avoids unwanted back-scattering toward the detector 7, which may be substantially coincident with the source 2.

The Angled Element 220

The angled element 220 is rotatable about an axis of rotation that is substantially parallel to and in some example embodiments is proximate to or co-axial with the launch axis of the launch beam 8 in order to increase the size of the receiving aperture for the return beam 9. While in this disclosure, for convenience, reference is made to beams of energy, those having ordinary skill in the relevant art will appreciate that any form of radiated energy may be appropriate. The angled element 220 causes the launch beam 8 impinging upon it to be redirected 8a at a selectively variable angle therefrom.

As the angled element 220 is rotated about its axis of rotation without varying the angle of redirection, the redirected launch beam 8a traces a wall of a cone so that the launch beam 8a has components in two coordinate directions. When further redirected by the reflective element 230, the multi-coordinate aspects of launch beam 8a can be redirected substantially 360° in azimuth and also in elevation.

In some example embodiments, the angled element 220 is a refractive element, with the refraction of the angled element 220 at points about and around its axis of rotation differing in direction or extent or both to provide the aspect of selective variation in angle of redirection. In some example embodiments, the change in refraction may be substantially continuous.

In some example embodiments, this characteristic of different redirection of the angled element 220 about its axis of rotation may be provided by a wedge prism not dissimilar in function, configuration and orientation from the first Risley prism 420 of the example Risley system 400.

In some example embodiments, the angled element 220 comprises a wedge-shaped disk with a diameter of substantially 25 mm, a maximum length of 9 mm and a minimum height of 3 mm. In some example embodiments, the angled element 220 is composed of a high index material, such as Si or ZnSe.

In some example embodiments, the angled element 220 may be oriented so that its flat side (that is, the side that is substantially normal to the edges of the refractive element 220) is positioned proximate to the reflecting element 230 and away from the beam source 2 in order to reduce the size of any gap between the angled element 220 and the reflecting element 230. A reduced separation between the elements tends to reduce blocking of the return beam 9 by the walls of the rotator 210. In some example embodiments, the angled element 220 may be oriented so that its flat side is positioned toward the laser source 2.

In some example embodiments, the different refraction of the angled element 220 may be provided by varying the index of refraction along the refractive element 220.

In some example embodiments, the angled element 220 is mounted within the hollow-core body of the first motor 211 of the rotator 210.

In some example embodiments, a face of the angled element 220 proximate to the beam source 2 is secured to a mount (not shown) driven by the first motor 211 of the rotator 210. The mount (not shown) serves to position the angled element 220 proximate to the reflecting element 230. In some example embodiments, the mount (not shown) is a cylindrical tube extending through a hollow core of the second motor 212 of the rotator.

In some example embodiments, the angled element 220 may be a mirror angled at a variable angle relative to the axis of rotation. In some example embodiments, the angled element 220 is mounted on a rod that is co-axial with and rotates about the axis of rotation. In some example embodiments, the rod may be a motor shaft for the first motor 211 of the rotator 210.

In some example embodiments, the angles of the optical surfaces of the angled element 220, cylinder 240 and reflecting element 230 in the optical path are arranged to reduce the likelihood of direct Fresnel reflection back onto the source 2 and the detector 7 from the reflecting surface 231 for all scanning angles, when used in a sensor configuration as described below. In some example embodiments, one or more of the optical surfaces of the angled element 220, cylinder 240 and reflecting element 230 in the optical path are coated with an anti-reflective coating. Some or all of these measures may in some example embodiments serve to reduce the minimum range of the LIDAR head 200.

The launch beam 8 is redirected by the angled element 220 onto the reflecting element 230.

The Reflecting Element 230

The reflecting element 230 is positioned on the other side of the angled element 220 from the beam source 2. The reflecting element 230 is rotatable about a rotational axis that is parallel to and in some example embodiments co-axial with the rotational axis of the angled element 220. The reflecting element 230 is rotationally driven by the second motor 212 of the rotator 210.

The reflecting element 230 comprises a substantially planar reflecting surface 231 such that an axis normal to the reflecting surface 231 is angled relative to the rotational axis of the reflecting element 230. The angle formed by the axis normal to the reflecting surface 231 and the rotational axis of the reflecting element 230 is fixed. In some example embodiments, this angle may be substantially 45°. In some example embodiments, this angle may be 46.8°.

The reflecting surface 231 reflects the launch beam 8a impinging upon it after refraction thereon through the angled element 220 onto the object 10. Coverage of the FOV in a variety of scanning patterns by a single launch beam 8 fixed in orientation is effected by independently varying the rotation and amount of redirection of the angled element 220 and the amount of rotation of the reflecting element 230 by spinning the first and second motors 211, 212 of the rotator 210 respectively. In some example embodiments, if the launch beam 8a refracted by the angled element 220 is divided into components respectively parallel to and transverse to the launch axis, the beam 8a that is redirected by the angled element 220 may have a launch axis component that extends in the same direction as the launch beam 8 before it impinges on the angled element 220, while the beam 8b that is redirected by the reflecting element 230 may have a launch axis component that may extend in the same or opposite direction as the launch beam 8 before it impinges on the angled element 220.

The reflecting surface 231 may be enclosed within a refractive element to provide an optical window and to provide a balanced substantially non-eccentric load while reducing the mass of the reflecting element 230. In some example embodiments, the reflecting element 230 may comprise a prism with an interiorly-disposed reflecting surface 231.

In some example embodiments, such a prism may have one or more angled flat facets 232 oriented at a base 233 thereof at a multiple of 90°. Such angled facets 232 may serve to increase the optical receiving aperture for a given size of reflective surface 231 and/or concomitantly reducing the overall size of the LIDAR head 200 by directing the beam 8a incident on the reflecting surface 231 at a smaller angle after refraction through the angled facet(s) 232. In addition, one of such angled facets 232 may serve as an optical window through which the beam 8a will pass before impingement on the reflecting surface 231. In some example embodiments, such a prism may have one, two or four angled facets 232.

In some example embodiments, the reflecting element 230 may have a rectangular base 233 with a maximum diagonal dimension of substantially 62 mm and a rectangular top with a maximum diagonal dimension of substantially 52 mm, separated by a height of substantially 46 mm. In some example embodiments, the reflecting element 230 may comprise 4 trapezoidal angled facets 232. When the reflecting element 230 comprises a prism with four angled facets 232, the reflecting element 230 may resemble a "hut" shape.

The configuration of the reflecting element 230, including the number of facets 232, may reflect mechanical, as opposed to purely optical, design considerations. The rotational rate of the reflective element 230, which in some example embodiments may approach 3000 rpm, may impart significant aerodynamic drag on it that may impose a significant load on the second motor 212.

A greatly simplified calculation of the torque imposed on the second motor 212 by various potential shapes for reflecting element 230, including by way of non-limiting example, a one face prism (a simple truncated cone with one facet), a symmetric cut prism (a simple truncated cone with two diametrically opposed facets) and a square cut prism (a simple truncated cone with four facets whose intersection with the base defines a square) was modeled. These models suggest that the torque imposed increases slightly with the number of facets 232.

The square cut prism and symmetric cut prism embodiments described above are substantially symmetrically balanced about the axis of rotation, while the one face prism is unbalanced and thus imposes an eccentric load on the second motor 212. Simplified calculations suggest that increasing the number of facets 232 employed on the reflecting element 230 and the concomitant mass reduction thereof may significantly reduce the eccentric loading on the second motor 212 and thus the risk of a violent fracture of the reflecting element 230 upon high speed rotation.

Additionally, by increasing the number of facets 232 for a reflecting element 230 of comparable composition and dimension, both the mass and rotational inertia of the reflecting element 230 may be reduced.

In some example embodiments, the reflecting element 230 is composed of a high refractive index material. The use of a high refractive index material permits the overall size of the reflecting element 230 to be reduced. In some example embodiments, the high refractive index material is ZnSe, which may provide a refractive index of 2.458 at 1.5 µm, with good transmission characteristics at 1.5 µm and an absorption coefficient of substantially $5 \times 10^{-4}$ cm$^{-1}$. In some example embodiments, prism grade ZnSe exhibits minimal refractive index variations within the material on planes perpendicular to the growth direction as well as in other directions. Refractive index variations of less than substantially 3 ppm at 0.6328 µm irrespective of orientation have been reported. In some example embodiments, the reflecting element 230 may be composed of other suitable material, including without limitation SF11 glass.

The Cylinder 240

In some example embodiments, the base 233 of the reflecting element 230 may be mounted onto a cylinder 240, by which the second motor 212 of the rotator 210 may rotate the reflecting element 230 about its rotational axis. The cylinder 240 may also serve to cause the reflecting element 230 to protrude slightly beyond the angled element 220 and the rotator 210 to facilitate the redirection of the launch beam 8 through the angled element 220 and onto the reflecting surface 231 and to facilitate the provision of a FOV of substantially 360° in azimuth. The separation between the base 233 of the reflecting element 230 and the angled element 220 facilitates independent and substantially frictionless rotation of the angled element 220 and the reflecting element 230. In some example embodiments, this separation may be made as small as mechanically feasible.

In some example embodiments, the protrusion of the reflecting element 230 beyond the angled element 220 caused by the introduction of the cylinder 240, in conjunction with the use of high index materials for the reflecting element 230 facilitates the positioning of mounts of the rotator 210 at a lower elevation, in some example embodiments, below −35°, which may be otherwise difficult to achieve.

In some example embodiments, the cylinder 240 comprises optical grade glass to improve the optical beam confinement by reducing the beam angle relative to the launch axis and concomitantly improving the receiving optical aperture available for a given inner diameter of the hollow shaft motor [WHICH ONE, FIRST OR SECOND] of the rotator 210.

The Source 2

The LIDAR head 200 is employed to redirect a launch beam 8 of radiated energy about the FOV. The launch beam 8 is generated by a source 2. In some example embodiments, the source 2 may be a laser. In some example embodiments, the source 2 has sufficient peak power for impingement on the LIDAR head 200 and redirection by the LIDAR head 200 about the FOV for impingement on one or more objects 10 positioned within the FOV within an maximum range of the sensor 200.

Additionally, in order to provide scanning about the entire FOV, the beam source 2 is in some example embodiments pulsed with a high pulse repetition rate (PRF).

In some example embodiments, a pulsed fiber laser having a maximum peak power of 13 kW, continuous wave (CW) power of 1.3 W and a PRF of 200 kHz, such as laser model number PEFL-K06-RP-048-004-025-1540-T1-ET1-PK5A-FA, manufactured by Keopsys Inc. of Whitehall, Pa., may be appropriate. The example Keopsys laser has a weight of 0.45 kg, consumes a maximum power of 25 W and measures 60 mm in diameter×25 mm in height.

Single mode (SM) pulse fiber lasers generally exhibit good beam properties. By way of non-limiting example, the described Keopsys laser can deliver a Gaussian beam with beam quality factor $M^2 < 1.2$.

The minimum angular resolution of the sensor 200 may be determined by the divergence of the launch beam 8. By way of non-limiting example, a minimum angular resolution of 1.5 mrad calls for a maximum beam divergence of approximately 0.75 mrad. Thus, the example Keopsys laser, with an exit beam size of substantially 3 mm, displays a beam divergence of substantially 0.78 mrad.

By way of non-limiting example, the example Keopsys laser has a peak power of 1500 W if pulsed at a PRF of 200 kHz. Assuming, by way of non-limiting example, that the detector 7 has a sensitivity of −40 dBm ($10^{-7}$ W), the maximum range of a sensor 200 employing the Keopsys laser may be substantially greater than 300 m. By way of non-limiting example, such a Keopsys laser has a peak power of 15 kW when the PRF is reduced by an order of magnitude to 20 kHz. Assuming similar sensitivity of the detector 7, the maximum range may be extended to substantially beyond 1 km for targets with, by way of non-limiting example, 80% diffusive reflection.

In some example embodiments, it is beneficial to have as small a sensor package as possible.

In some example embodiments, the source 2 may be a continuous beam, rather than a pulsed beam. In some example embodiments employing continuous-wave (CW) launch beams 8, alternative ranging mechanisms, including by way of non-limiting example, phase modulation measurement of phase at corresponding points at launch and at detection in respectively, the launch beam 8 and at least a portion of the return beam 9, to calculate the range, may be employed.

The Optical Path

Example embodiments of the optical path of the LIDAR head 200 will now be described. One example embodiment of the optical path, shown generally at 500 is shown in the optical path diagram of FIG. 5. In the Figure, a parabolic mirror 510 is positioned along the path of the launch beam 8, between the source 2 and the LIDAR head 200. The launch beam 8 passes through a small aperture 511 in the centre of the mirror 510 and toward the LIDAR head 200.

In some example embodiments, the aperture 511 may be substantially 2-3 mm wide. As is characteristic with monostatic optical systems, upon reflection off the object 10 (not shown), the return beam 9 is co-aligned with the launch beam 8, reflects off the mirror 510 and is focused toward the transversely-mounted detector 7. In some example embodiments, the detector 7 may be an avalanche photodiode (APD) or a receiving fiber.

As discussed previously, one disadvantage of a monostatic optical system is that it is less immune to light scattering by the optics in the launch path as compared to bistatic optical systems. In some example embodiments, the detector 7 may be blinded by the scattered light for a few meters. The imposition of a parabolic mirror 510 may serve to minimize the effect of light scattering.

Figure 5:
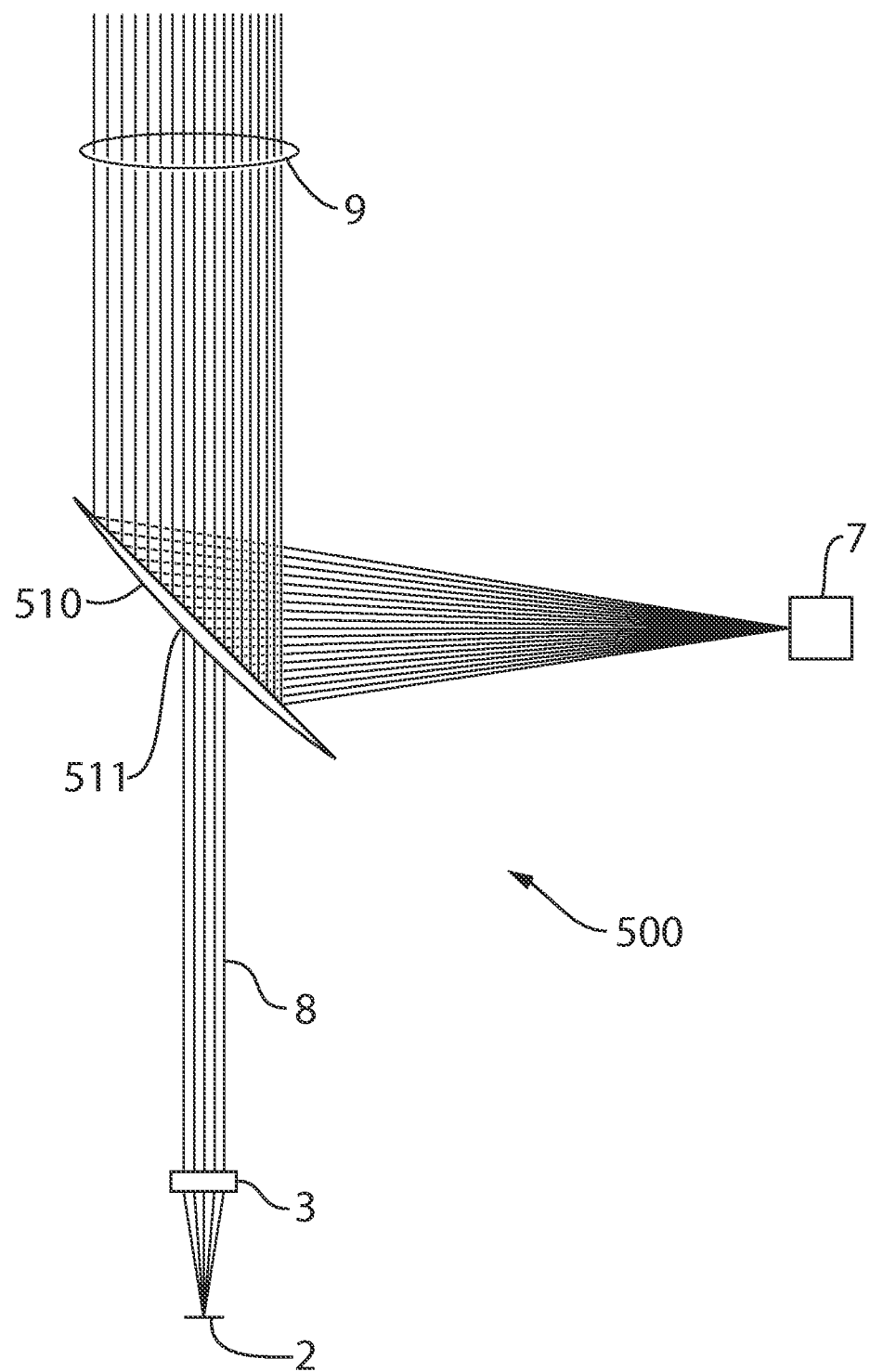
FIG. 5 is a schematic of an optical path of an example embodiment of the LIDAR head of FIG. 2, showing a transversely-mounted detector.
Figure 6:
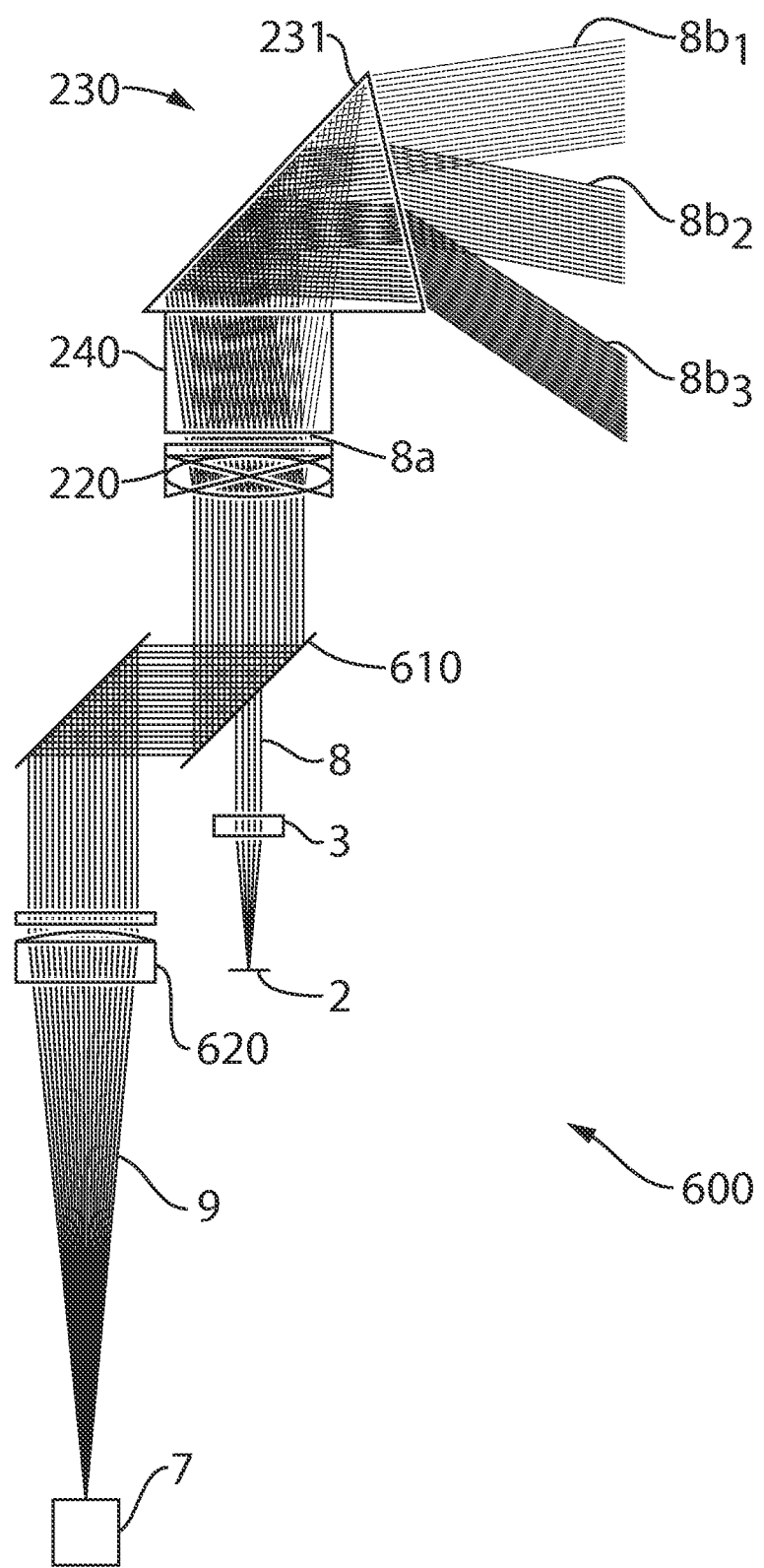
FIG. 6 is a schematic of an optical path of an example embodiment of the LIDAR head of FIG. 2, showing a parallel-mounted detector and showing an example range of scanning positions of the LIDAR head.

In FIG. 6, the optical path diagram of FIG. 5 is altered to show a parallel-mounted detector 7 and to show a plurality of example optical paths generated by the scanning LIDAR head 200 (three are shown).

In FIG. 6, the parabolic mirror 510 is replaced by a folding mirror 610, again with a small aperture in it to allow the launch beam 8 to pass through it on its way to the LIDAR head 200. The co-aligned return beam 9 is reflected by folding mirror 610 and further reflected by a second folding mirror 611 to cause the return beam 9 to traverse a parallel path to the original launch beam 8. This permits the LIDAR head 200 to be housed in a more compact package and avoids blocking a look-down beam (not shown). Moreover, it provides a relatively long receiving path that serves to reduce the effect of light scattering on the detector 7. Still further, it is often more advantageous in terms of engineering and cost to implement an additional planar mirror than an off-axis parabolic mirror 510. In some example embodiments, a laser line filter 620 is interposed in the return beam path between the second folding mirror 611 and the detector 7.

FIG. 6 also shows the refractive element 220 and the reflecting surface 231 of the reflecting element 230 in three positions, and the corresponding beams impinging upon the target $8b_1$, $8b_2$, $8b_3$.

Operation

In operation, in some example embodiments, a train of pulses of the launch beam 8 is generated by the source 2 and directed along the launch axis toward the LIDAR head 200. A first pulse impinges on the angled element 220, which has been rotated to a specific rotational position by the first motor 211, that determines the direction and extent of redirection of the first pulse onto the reflecting surface 231 of the reflecting element 230, which in turn has been rotated to a specific rotational position by the second motor 212, causing the pulse to be reflected in a given direction. The combination of the rotational positions of the angled element 220 (that dictates direction and extent of redirection) and the reflecting element 230 cause the first pulse in the train to be directed to a specific azimuthal and elevation coordinate position within the FOV. By the time that each subsequent pulse of the train impinges upon the angled element 220, the first motor 211 has varied its rotational position and the second motor 212 has varied the rotational position of the reflecting element 230, such that the direction and extent of redirection of such pulse onto the reflecting surface 231 and the direction of reflection by the reflecting surface 231 causes such pulse in the train to be directed to another specific azimuthal and elevation coordinate position within the FOV, which in some example embodiments may be different from that of one or more previous pulses.

Figure 7:
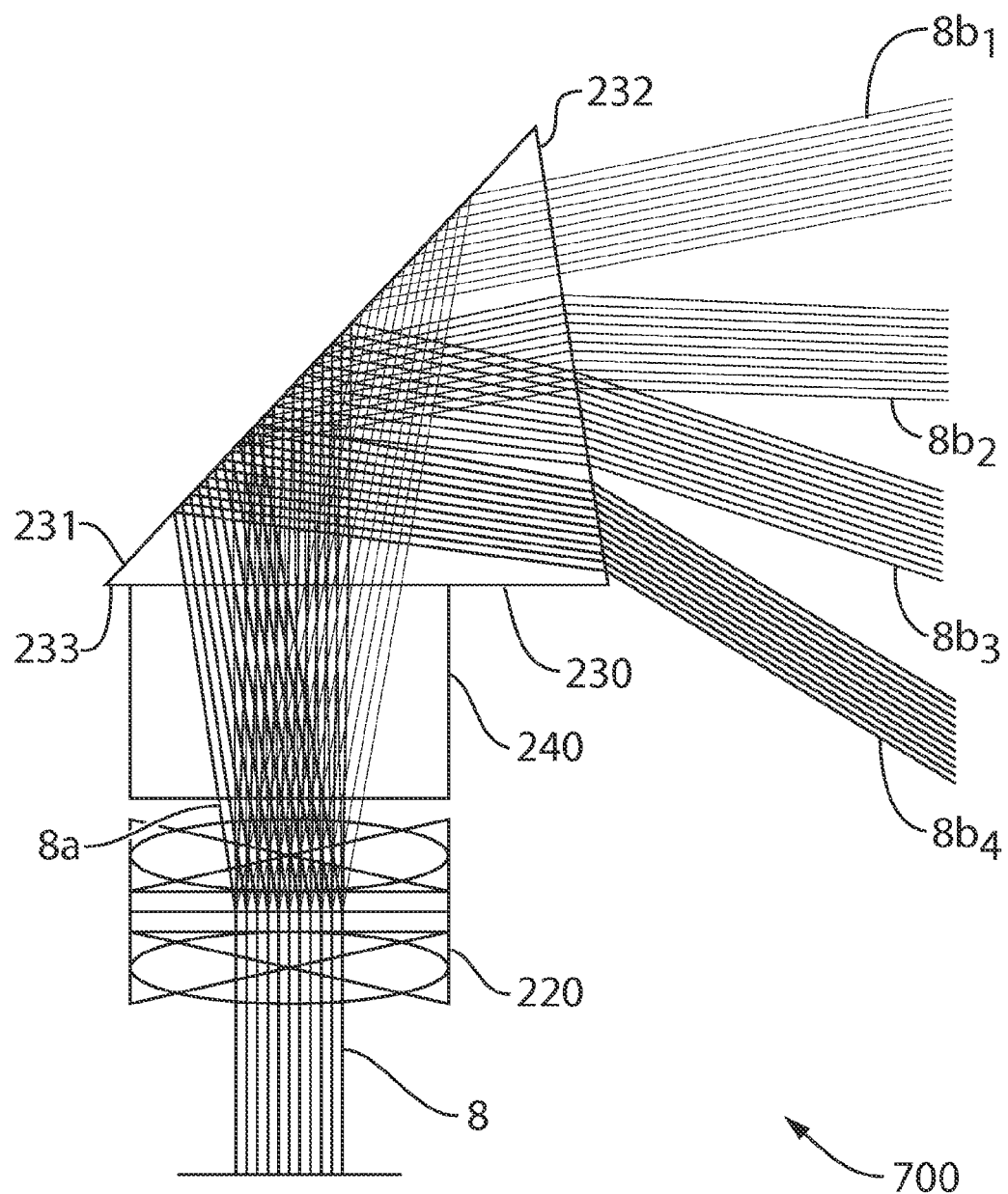
FIG. 7 is a side view optical path diagram showing four example scanning angles of an example embodiment of the LIDAR head of FIG. 2.
Figure 8:
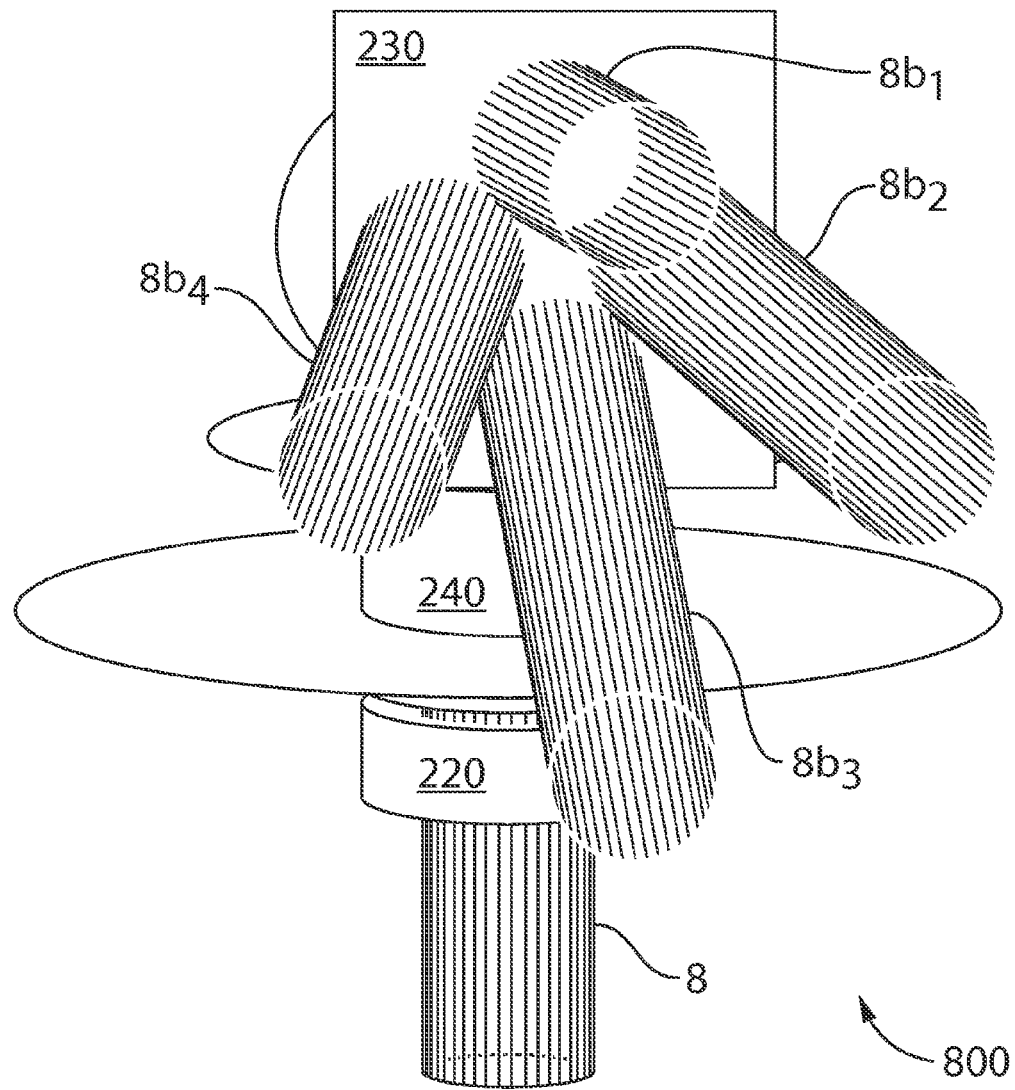
FIG. 8 is a 3D perspective view of the optical path diagram of FIG. 7.

FIG. 7 shows a side view and FIG. 8 shows a corresponding 3D perspective view of the optical components of the LIDAR head 200 (only the optical elements of the reflecting element 230, namely the base 233, the reflecting surface 231 and one of the facets 232 are shown) with four different scanning angles $8b_1$, $8b_2$, $8b_3$, $8b_4$ formed by different rotational positions of the angled element 220 and the reflecting element 230.

A casual observer might conclude from cursory consideration of the architecture of the LIDAR head 200 that the scanning action comprises two parts, namely the reflecting surface 231 rotating 360° to provide a scan in the azimuthal direction, and the angled element 220 scanning left and right (in the paper plane of FIG. 7) to provide a scan in the elevation direction. However, this intuitive concept is misleading and inaccurate.

Consider the situation where the launch beam 8 is scanned by an element driven by the first motor 211 in a plane ranging ±10° left and right, for example by a galvanometer-driven mirror whose scanning axis is parallel to the mirror surface (not shown). If the reflecting surface 231 is at the angle shown in FIG. 7, the outgoing beam will scan ±10° in the elevation direction. However, if the reflecting surface 231 is simultaneously rotated by 90°, the outgoing beam will stay at a fixed angle in elevation because the scanned beams will have an identical angular component that decides the elevation angle of the beams after reflection by the reflecting surface 231 irrespective of the scanning angle for the left-right scanned beam.

Rather, in order to ensure that the refractive element 220 causes the launch beam 8 to impinge upon the reflecting surface 231, the element scanned by the first motor 211 should scan the launch beam 8 in a cone rather than a plane. This is effected by causing the first motor 211 of the rotator 210 to rotationally drive the refractive element 220, whose refraction differs in direction and extent about its rotational axis.

Accordingly, the interaction of the outgoing scan is not easily understood without computer modeling.

Figure 9:
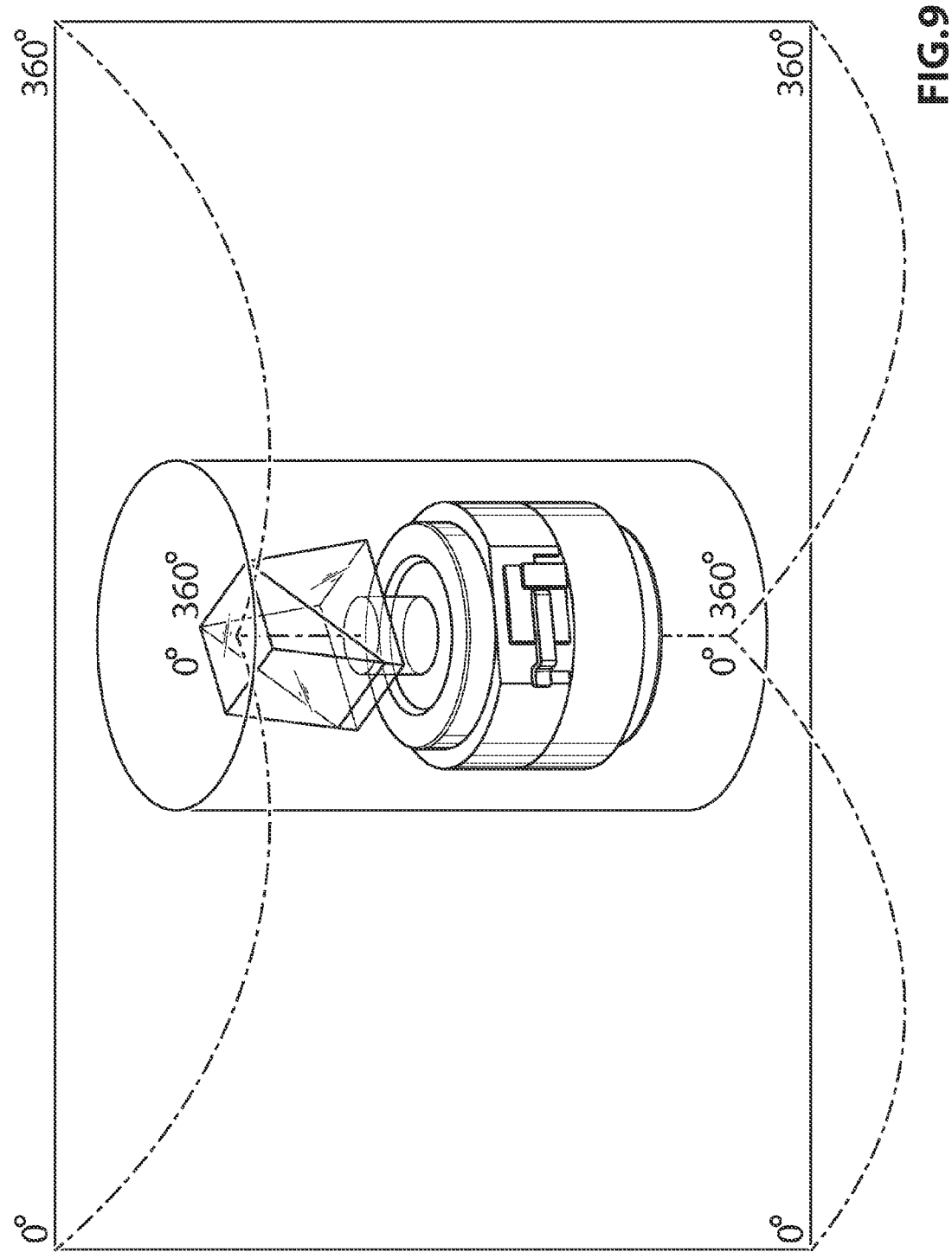
FIG. 9 is a schematic representation illustrating the correlation between azimuthal and elevation FOV and a 2D representation thereof.

In order to understand the operation of the LIDAR head 220 and the various functions of the refractive element 220 and the reflective element 230, consider the scenario where an imaginary cylindrical wall is positioned about the LIDAR head 200 such that its axis of symmetry was co-axial with the optical axis of the LIDAR head 200, the FOV of the LIDAR head 200 might be displayed in a 2D representation where azimuth is shown along a horizontal axis and elevation along a vertical axis by cutting the cylindrical wall and flattening it out as shown in FIG. 9. This 2D construct will be used in subsequent figures to assist in understanding the operation of the LIDAR head 200.

Under such a construct, the theoretical coverage of a LIDAR system providing evenly distributed scanning across 360° of azimuth and 45° of elevation at a resolution of 3 mrad would be shown as a matrix of 548628 points displayed in a 2094×262 array. In some example embodiments, the elevation range may be biased below the horizon, in some example embodiments, ranging from substantially +10° to substantially −35°.

Figure 10:
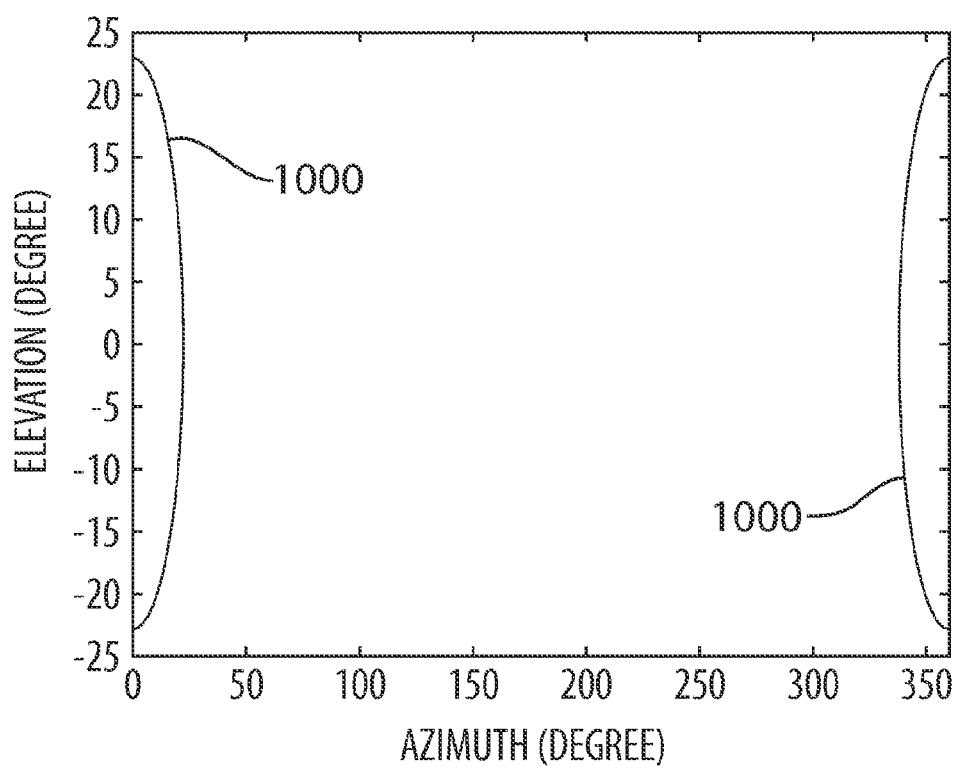
FIG. 10 is a 2D representation of the FOV of an example embodiment of the LIDAR head of FIG. 2 where the refractive element is rotated at 1 rotation per second and the reflecting element is held stationary for 1 s at a pulse repetition frequency of 10 kHz.

In order to better understand the function of the angled element 220 within the LIDAR head 200, consider FIG. 10, in which the reflecting element 230 is held stationary and the angled element 220 is rotated by the rotator 210 at a rate of 1 revolution per second. In this case, the scan pattern 1000 displayed across the FOV will be close to circular. The launch beam 8 is redirected by the angled element 220 onto the reflecting element 230 substantially along its axis of rotation, which is parallel to and in some example embodiments may be the same as the axis of rotation of the angled element 220. This permits the LIDAR head 220 to achieve optical synchronization between the launch beam 8 and the detector 7 (which may be a TOF or phase detection receiver) so that the detector 7 always tracks the launch beam 8 on the object 10 during scanning.

Figure 11:
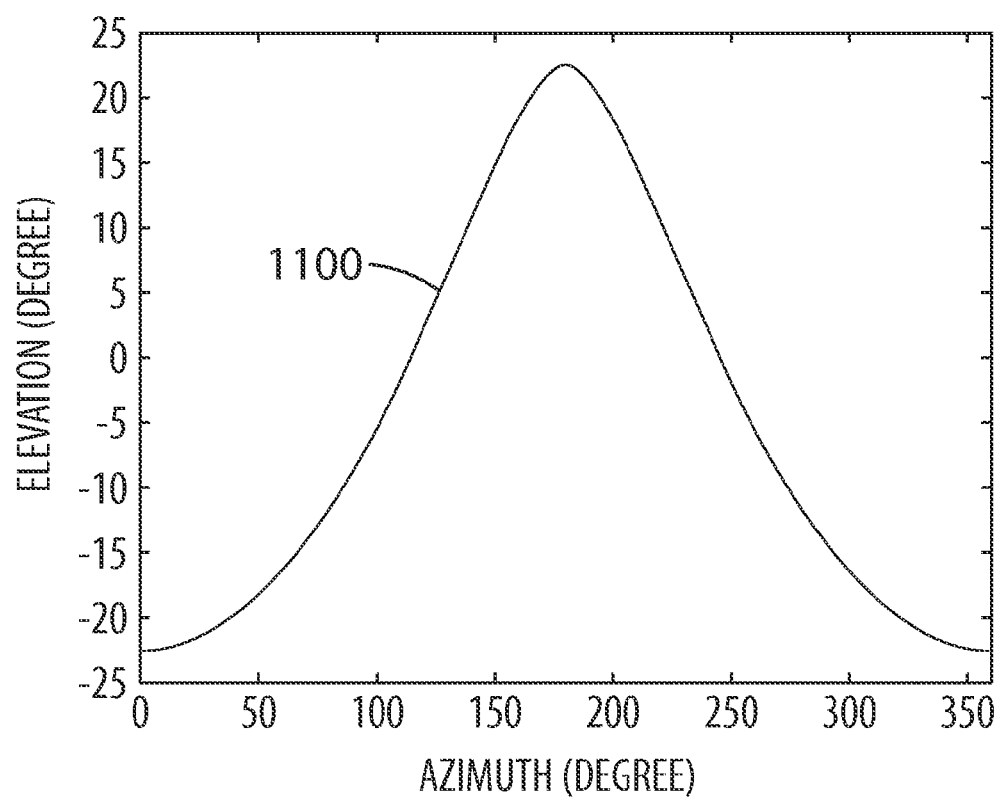
FIG. 11 is a 2D representation of the FOV of an example embodiment of the LIDAR head of FIG. 2, where the refractive element is held stationary and the reflecting element is rotated at 1 rotation per second for 1 s at a pulse repetition frequency of 10 kHz.

In order to better understand the function of the reflecting element 230, within the LIDAR head 200, consider FIG. 11, in which the angled element 220 is held stationary and the reflecting element 230 is rotated at 1 revolution per second. In this case, the scan pattern 1100 displayed across the FOV will be roughly sinusoidal, having a period of 360°, varying substantially in in both elevation and azimuth.

Thus it may be seen that the reflecting element 230 tends to direct the laser beam 8 impinging upon it after redirection by the angled element 220 in all azimuthal directions. This is facilitated by the angled element 220 directing the refracted laser beam 8 at a substantially fixed angle relative to the axis of rotation of the reflecting surface 230.

As either the angled element 220 or the reflecting element 230 can direct the launch beam 8 independently in either or both of azimuth and elevation, the final beam pattern may be determined by a combination of factors, including the rotational velocity of the first motor 211 driving the angled element 220, the second motor 212 driving the reflecting element 230, the relative difference between their rotational velocities and the PRF of the pulse train.

The rotational velocities of the first motor 211 and the second motor 212 may, in some example embodiments, be chosen to ensure that when the reflecting element 230 commences a new revolution, the beam pattern thus generated will not significantly overlap previously scanned points during a previous scan.

Figure 12:
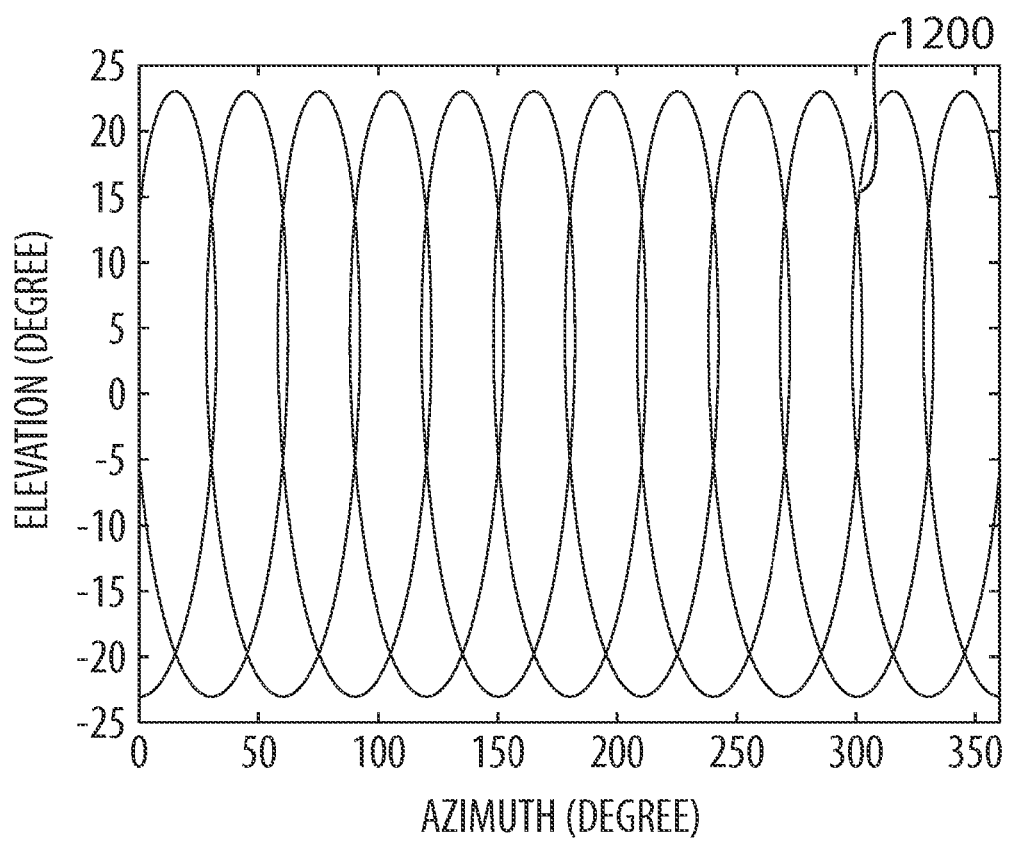
FIG. 12 is a 2D representation of the FOV of an example embodiment of the LIDAR head of FIG. 2, where the refractive element is rotated at 1 rotation per second and the reflecting element is rotated at 10 rotations per second for 1 s at a pulse repetition frequency of 10 kHz.
Figure 13:
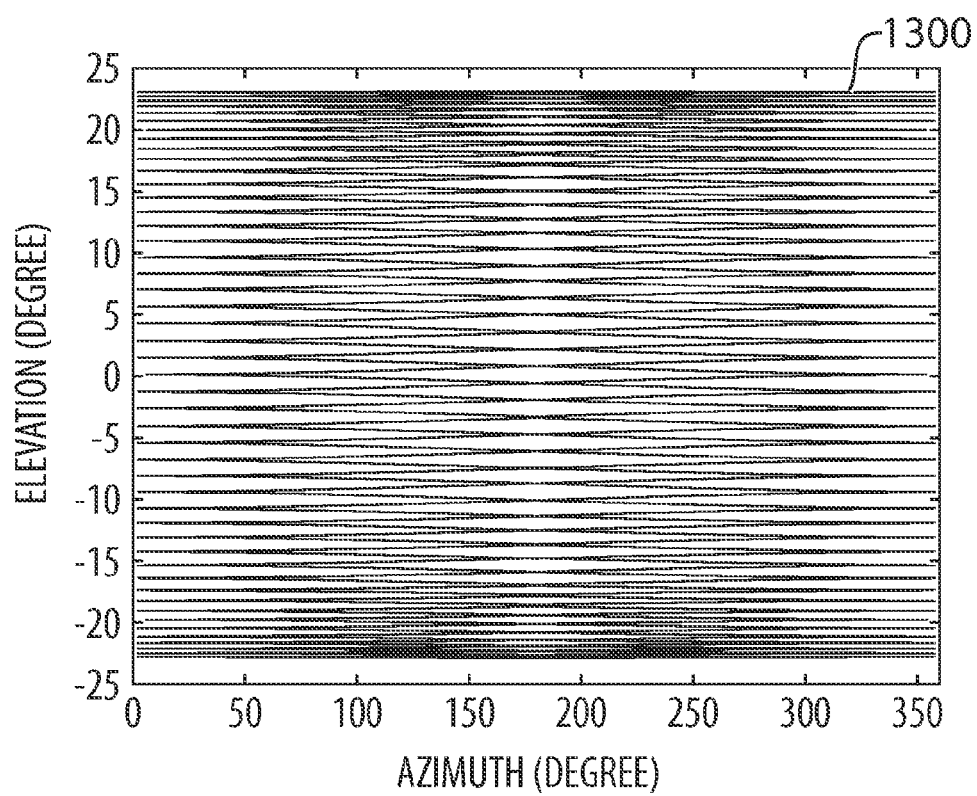
FIG. 13 is a 2D representation of the FOV of an example embodiment of the LIDAR head of FIG. 2, where both the refractive element and the reflecting element are rotated at 100 rotations per second for 1 s at a pulse repetition frequency of 20 kHz.
Figure 14:
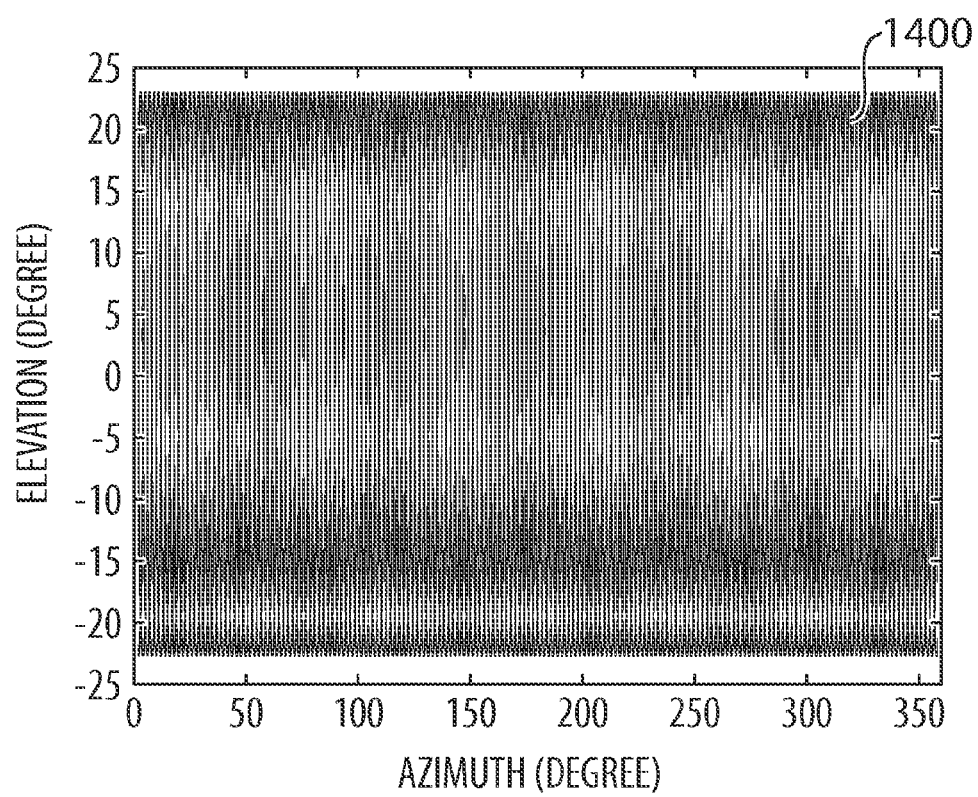
FIG. 14 is a 2D representation of the FOV of an example embodiment of the LIDAR head of FIG. 2, where both the refractive element and the reflecting element are rotated at 100 rotations per second for 1 s at a pulse repetition frequency of 100 kHz.

Using detailed computer modeling, the coverage of a given scan scenario may be compared against an ideal uniform raster scan for a given PRF and scan period using statistical modeling by measuring 3D points using Delaunay triangles, non-limiting examples of which are shown in FIGS. 12 through 14.

In FIG. 12, the refractive element 220 is rotated by the first motor 211 at 1 revolution per second while the reflecting surface 231 is rotated by the second motor 212 at 10 revolutions per second, over a scanning period of 1 s at a PRF of 10 kHz. A scan pattern 1200 having relatively complete coverage of the entire FOV may be observed.

In FIG. 13, where the refractive element 220 is rotated by the first motor 211 and the reflecting surface 231 is rotated by the second motor 212 both at 100 revolutions per second, for a period of 1 s at a PRF of 20 kHz, more dense coverage is obtained as may be seen by scan pattern 1300.

Finally, in FIG. 14, a scan pattern 1400 having relatively dense but even coverage is obtained by increasing the PRF to 100 kHz.

Figure 15:
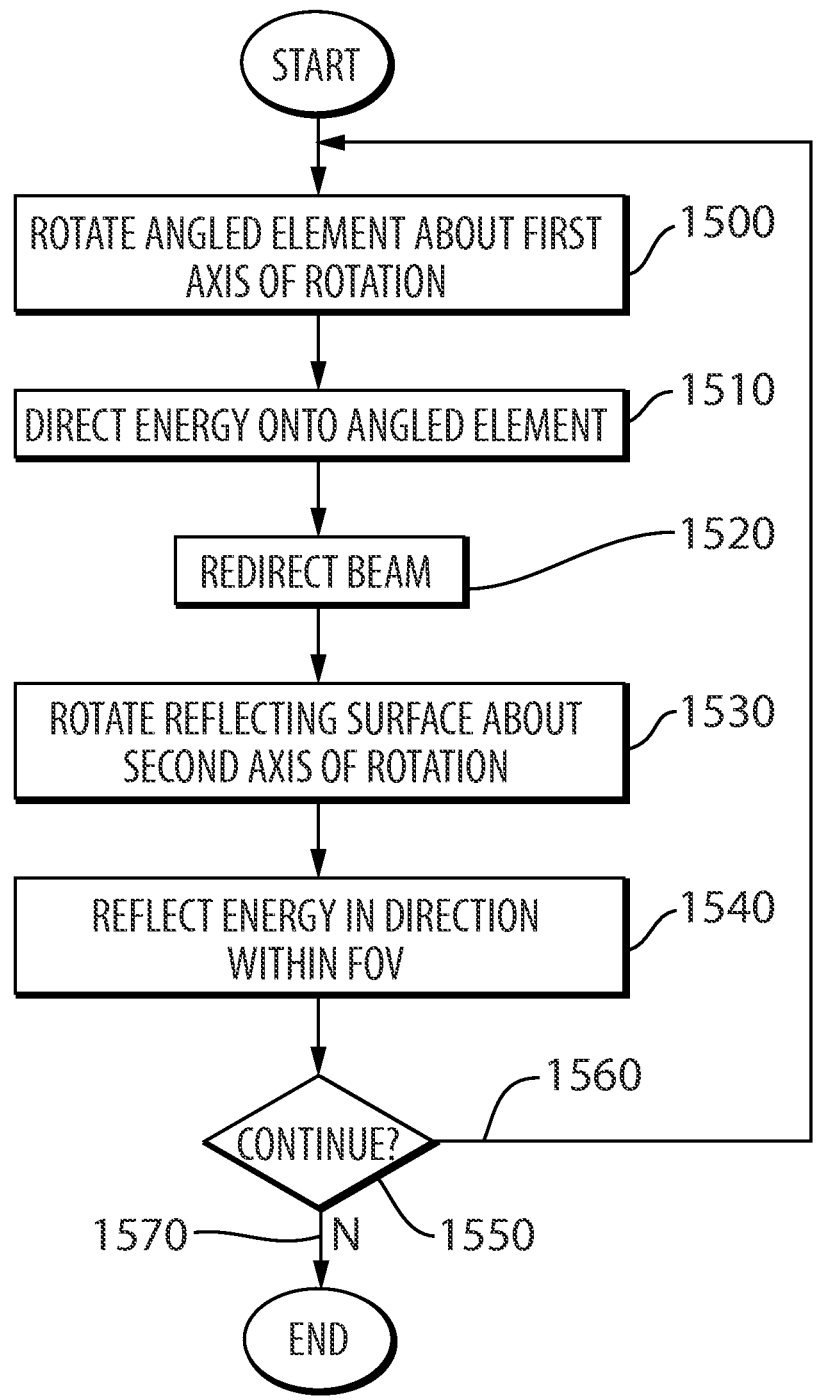
FIG. 15 is flowchart illustrating example method actions of a method of directing radiated energy from a source to a coordinate in a field of view (FOV) defined by at least one of azimuth and elevation in accordance with an example embodiment of the present disclosure.

Turning now to FIG. 15, a flow chart showing example processing actions of an example embodiment of a method of directing radiated energy, in some examples in the form of launch beam 8, from the source 2 to a coordinate in a field of view (FOV) defined by at least one of azimuth and elevation, is shown.

Action 1500 comprises rotating the angled element 220 about the first axis of rotation.

Action 1510 comprises directing the launch beam 8 onto the angled element 220.

Action 1520 comprises the angled element 220 redirecting the redirected beam 8a, the redirection of the angled element 220 differing in at least one of direction and extent as it is rotated.

Action 1530 comprises independently rotating the reflecting surface 231 about the second axis of rotation, the reflecting surface 231 being positioned such that the angled element 220 lies between the reflecting surface 231 and the source 2.

Action 1540 comprises the reflecting surface 231 receiving the beam 8a redirected by the angled element 220 onto a point thereon and reflecting it in a direction within the FOV.

At decision point 1550, it is determined whether to continue to another point within the FOV. If so, processing 1560 returns to action 1500, such that at least one of the angled element 220 about the first axis of rotation (action 1500) and the reflecting surface 231 about the second axis of rotation (action 1530) is further rotated. If not, processing 1570 terminates.

It will be apparent that various modifications and variations may be made to the embodiments disclosed herein, consistent with the present disclosure, without departing from the spirit and scope of the present disclosure.

In the foregoing disclosure, for purposes of explanation and not limitation, specific details are set forth such as particular architectures, interfaces, techniques, etc. in order to provide a thorough understanding of the present disclosure. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods and actions can be performed by a programmable processor executing a program of instructions to perform functions of the disclosure by operating on input data and generating output.

The disclosure can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language. Further, the foregoing description of one or more specific embodiments does not limit the implementation of the invention to any particular computer programming language, operating system, system architecture or device architecture.

The processor executes instructions, codes, computer programs, scripts which it accesses from hard disk, floppy disk, optical disk (these various disk based systems may all be considered secondary storage), ROM, RAM, or the network connectivity devices. Multiple processors may be present. Thus, while instructions may be discussed as executed by a processor, the instructions may be executed simultaneously, serially, or otherwise executed by one or multiple processors.

When provided by a processor, the functions may be provided by a single dedicated processor, by a single shared processor, or by a plurality of individual processors, some of which may be shared or distributed. The functions of the various elements including functional blocks labelled as "modules", "processors" or "controllers" may be provided through the use of dedicated hardware, as well as hardware capable of executing software in association with appropriate software with sufficient processing power, memory resources, and network throughput capability to handle the necessary workload placed upon it. Moreover, explicit use of the term "module", "processor" or "controller" should not be construed to refer exclusively to hardware capable of executing software, and may include, without limitation, digital signal processor (DSP) hardware, read-only memory (ROM) for storing software, random access memory (RAM) and non-volatile storage.

Suitable processors include, by way of example, both general and specific microprocessors. Generally, a processor will receive instructions and data from a read-only memory or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches or flip flops. Any of the foregoing can be supplemented by, or incorporated in ASICs (application-specific integrated circuits), FPGAs (field-programmable gate arrays) or DSPs (digital signal processors).

Examples of such types of computer are programmable processing systems suitable for implementing or performing the apparatus or methods of the disclosure. The system may comprise a processor, (which may be referred to as a central processor unit or CPU), which may be implemented as one or more CPU chips, and that is in communication with memory devices including secondary storage, read only memory (ROM), a random access memory, a hard drive controller, or an input/output devices or controllers, and network connectivity devices, coupled by a processor bus.

Secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage.

I/O devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) or global system for mobile communications (GSM) radio transceiver cards, and other well-known network devices. These network connectivity devices may enable the processor to communicate with an Internet or one or more intranets. The network connectivity devices may also include one or more transmitter and receivers for wirelessly or otherwise transmitting and receiving signal as are well known. With such a network connection, it is contemplated that the processor might receive information from the network, or might output information to the network in the course of performing the above-described method steps.

Such information, which is often represented as data or a sequence of instructions to be executed using the processor for example, may be received from and outputted to the network, for example, in the form of a computer data baseband signal or signal embodied in a carrier wave. The baseband signal or signal embodied in the carrier wave generated by the network connectivity devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several well known methods.

Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

While example embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of a device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

The terms "couple" or "communicate" in any form are intended to mean either a direct connection or indirect connection through some interface, device, intermediate component or connection, whether electrically, mechanically, chemically, or otherwise.

References in the singular form include the plural and vice versa, unless otherwise noted.

The purpose of the Abstract is to enable the relevant patent office or the public generally, skill in the art who are not familiar with patent or legal terms or phraseology, to quickly determine from a cursory inspection the nature of the technical disclosure. The Abstract is neither intended to define the scope of this disclosure, which is measured by its claims, nor is it intended to be limiting as to the scope of this disclosure in any way.

In accordance with a first broad aspect of an embodiment of the present disclosure there is provided a head for directing radiated energy from a source to a coordinate in a field of view (FOV) defined by at least one of azimuth and elevation, comprising: an angled element rotatable about a first axis of rotation, the angled element for redirecting the energy, the redirection differing in at least one of direction and extent as it is rotated; and a planar reflecting surface rotatable about a second axis of rotation that is parallel to the first axis of rotation, a reflecting axis normal to the reflecting surface being at an angle to the second axis of rotation, the reflecting surface for receiving the energy redirected by the angled element at a point thereon and reflecting it in a direction within the FOV.

The head may comprise a rotator positioned between the source and the angled element for supporting and independently rotating the angled element and the reflecting surface about the first and second axes of rotation without impeding the energy. The rotator may comprise a first motor for rotating the angled element about the first axis of rotation at a first rotational velocity, a second motor for rotating the reflecting surface about the second axis of rotation at a second rotational velocity or both. The first rotational velocity may be different from the second rotational velocity. The rotator may comprise at least one hollow core motor, at least one brushless motor, an aperture for accepting the energy therethrough before it impinges upon the angled element or any combination of any of them.

The energy impinging upon the head may comprise a beam, which may be a laser beam, which may be pulsed.

The head may have a FOV that extends substantially 360° in azimuth, substantially 45° in elevation, which may extend between substantially +10° and −35°, or any combination of any of them.

The angled element may be substantially circular, a prism whose thickness varies across its extent or any combination of any of them. The angled element may have a refractive index that varies across its extent.

The first axis of rotation may be substantially parallel to a launch axis of the energy between the source and the angled element.

The redirection of the energy may be in a direction that has a launch axis component that moves away from the source.

The angled element may be a substantially planar reflector.

The reflective surface may be positioned such that the angled element lies between the reflecting element and the source. It may be housed within a reflective element for rotation about the second axis of rotation. Such reflective element may comprise a base and at least one angled facet extending from the base. A cylinder may be secured to the base. A first at least one facet may be oriented relative to a second at least one facet along the base at a multiple of 90°. The number of the at least one facets may be selected from a group consisting of 1, 2 and 4.

The angle between the axis of reflection and the second axis of rotation may be substantially 45°.

In accordance with a second broad aspect of an embodiment of the present disclosure there is disclosed a sensor comprising an energy source and such a head, the source for generating radiated energy for impingement onto the angled element of the head, the reflecting surface of the head for receiving the energy upon redirection by the angled element and for reflecting it toward an object within the FOV.

The sensor may further comprise a detector for receiving energy scattered by impingement upon the object, a focusing element for focusing the received energy onto the detector, a splitter for altering the path of the received energy relative to the path of the energy radiating from the source or any combination of any of them. The splitter may comprise a mirror having an aperture passing therethrough, which may comprise a parabolic mirror.

The sensor may comprise a time of flight (TOF) unit for determining a range to the object from an elapsed time between generation of the energy at the source and detection of the received energy at the detector, a phase detection unit for determining a range to the object from a phase difference between the energy at the source and the received energy detected at the detector or any combination of any of them.

In accordance with a third broad aspect of an embodiment of the present disclosure there is disclosed a method of directing radiated energy from a source to a coordinate in a field of view (FOV) defined by at least one of azimuth and elevation, comprising: rotating an angled element about a first axis of rotation; directing the beam onto the angled element; the angled element redirecting the beam, the redirection of the angled element differing in at least tone of direction and extent as it is rotated; and independently rotating a planar reflecting surface, having a reflecting axis normal to the reflecting surface, about a second axis of rotation that is parallel to the first axis of rotation and at an angle to the reflecting axis; the reflecting surface receiving the energy redirected by the angled element onto a point thereon and reflecting it in a direction within the FOV.

The method may comprise further rotating at least one of the angled element about the first axis of rotation and the reflecting surface about the second axis of rotation.

What is claimed is:

1. A head for directing radiated energy from a source to a coordinate in a field of view (FOV) defined by at least one of azimuth and elevation, comprising:
    a light bending element rotatable about an axis for receiving the radiated energy incident thereon along the axis and redirecting it as it is rotated;
    a reflecting surface rotatable about the axis and intersecting the axis for reflecting the radiated energy radiated by the light bending element and reflecting it in a direction within the FOV; and
    a rotator coaxial with the axis for independently rotating the light bending element and the reflecting surface.

2. A head according to claim 1, wherein the rotator comprises a first motor for rotating the light bending element at a first rotational velocity.

3. A head according to claim 2, wherein the rotator comprises a second motor for rotating the reflecting surface at a second rotational velocity.

4. A head according to claim 1, wherein the rotator comprises an aperture for accepting the energy therethrough before it impinges upon the light bending element.

5. A head according to claim 1, wherein the FOV extends substantially 360° in azimuth.

6. A head according to claim 1, wherein the FOV extends substantially 45° in elevation.

7. A head according to claim 1, wherein the light bending element is a wedge-shaped prism.

8. A head according to claim 1, wherein the redirection of the energy is in a direction that has a launch axis component, parallel to the axis, that moves away from the source.

9. A head according to claim 1, wherein the reflecting surface is a substantially planar reflector.

10. A head according to claim 1, wherein the reflective surface is positioned such that the angled element lies between the reflecting surface and the source.

11. A head according to claim 1, wherein the reflecting surface is housed within a refractive element rotatable about the axis.

12. A head according to claim 1, wherein the reflective element comprises a base and at least one angled facet extending from the base.

13. A sensor comprising an energy source and the head according to claim 1, the source for generating radiated energy for impingement onto the light bending element of the head, the reflecting surface of the head for receiving the energy upon redirection by the light bending element and for reflecting it toward coordinate within the FOV.

14. A sensor according to claim 13, further comprising a splitter for altering the path of the received energy relative to the path of the energy radiating from the source.

15. A sensor according to claim 14, the splitter comprising a mirror having an aperture passing therethrough.

16. A method of directing radiated energy from a source to a coordinate in a field of view (FOV) defined by at least one of azimuth and elevation, comprising:
    rotating a light bending element about an axis;
    directing the beam onto the light bending element;
    redirecting the beam from the light bending element;
    independently rotating a reflecting surface that intersects the axis about the axis;
    receiving the redirected energy onto a point on the reflecting surface and reflecting it in a direction within the FOV.

17. A head according to claim 1, wherein the source launches the radiated energy along the axis.

18. A head according to claim 1, wherein the rotator is positioned between the source and the light bending element for supporting and rotating the light bending element and the reflecting surface without impeding the radiated energy.

19. A head according to claim 1, wherein the direction and velocity of rotation of the reflecting surface is unconstrained by the direction and velocity of rotation of the light bending element.

* * * * *

UNITED STATES PATENT AND TRADEMARK OFFICE
CERTIFICATE OF CORRECTION

PATENT NO. : 9,791,555 B2  
APPLICATION NO. : 14/397155  
DATED : October 17, 2017  
INVENTOR(S) : Xiang Zhu Page 1 of 1

It is certified that error appears in the above-identified patent and that said Letters Patent is hereby corrected as shown below:

On the Title Page

Item (22) PCT Filed: "May 26, 2012" should be corrected to --April 26, 2012--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*